(No Model.) 3 Sheets—Sheet 1.

T. L. McKEEN.
CAR COUPLING.

No. 394,871. Patented Dec. 18, 1888.

WITNESSES,
F. L. Durand
Benj. G. Cowl

Thomas L. McKeen,
INVENTOR,
by Louis Bagger & Co.
Attorneys (No Model.) 3 Sheets—Sheet 2.

T. L. McKEEN.
CAR COUPLING.

No. 394,871. Patented Dec. 18, 1888.

WITNESSES,
F. L. Durand
Benj. G. Cook

Thomas L. McKeen,
INVENTOR,
by J. Louis Bagger & Co.
Attorneys (No Model.) 3 Sheets—Sheet 3.
T. L. McKEEN.
CAR COUPLING.
No. 394,871. Patented Dec. 18, 1888.
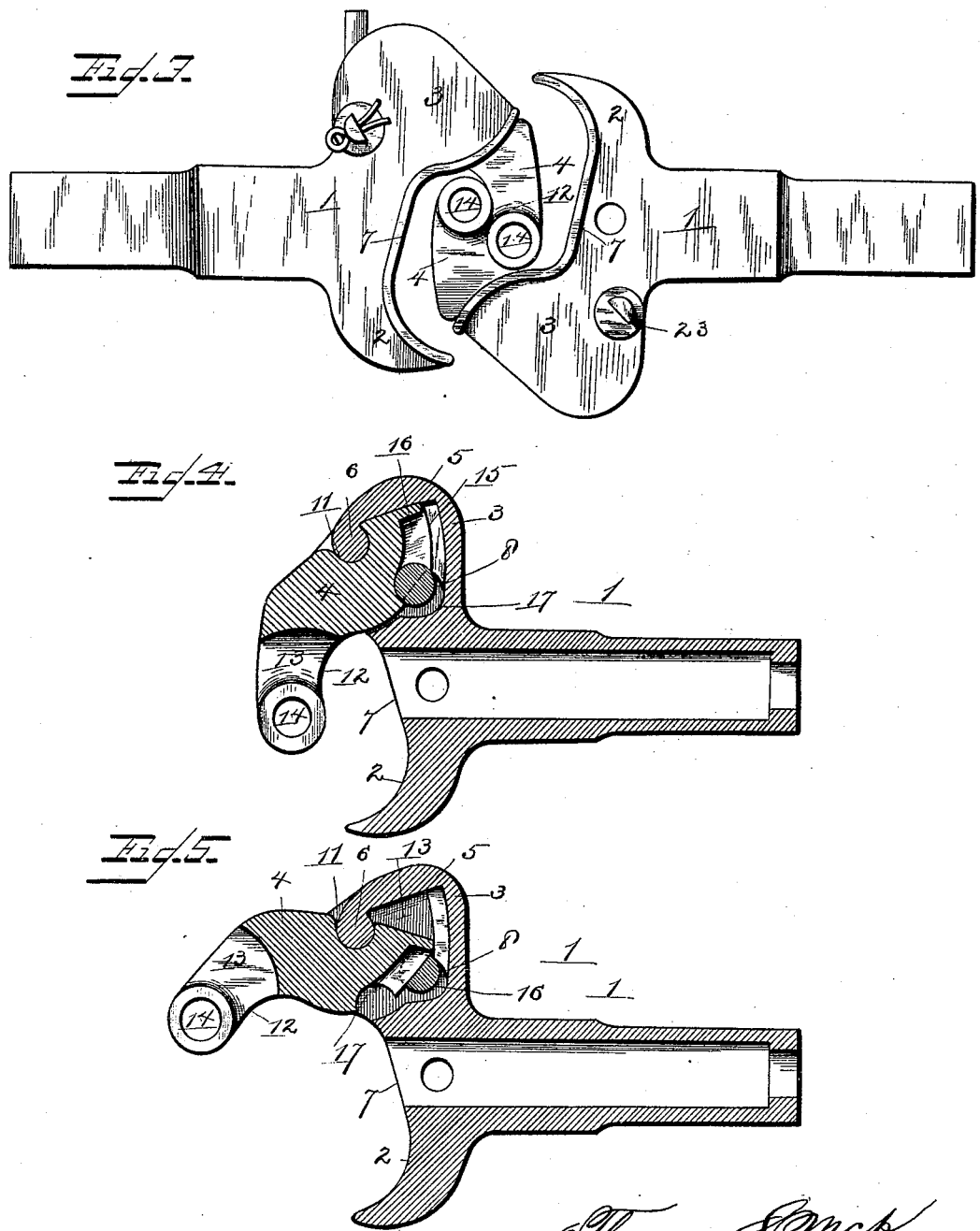
WITNESSES
F. L. Ourand
Benj. G. Cowl
INVENTOR,
Thomas L. McKeen
by J. Louis Pagger & Co.
Attorneys

UNITED STATES PATENT OFFICE.

THOMAS L. McKEEN, OF EASTON, PENNSYLVANIA.

CAR-COUPLING.

SPECIFICATION forming part of Letters Patent No. 394,871, dated December 18, 1888.

Application filed January 13, 1888. Serial No. 260,656. (No model.)

*To all whom it may concern:*

Be it known that I, THOMAS L. McKEEN, a citizen of the United States, and a resident of Easton, in the county of Northampton and State of Pennsylvania, have invented certain new and useful Improvements in Car-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1:
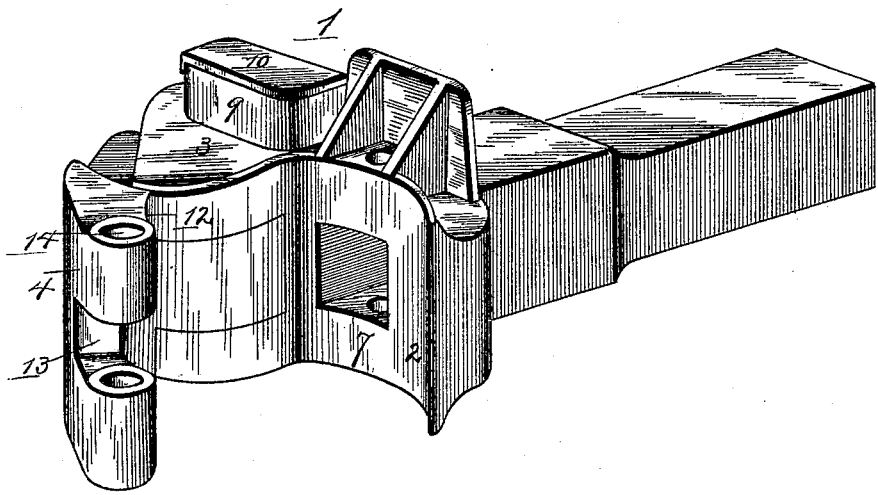
Figure 2:
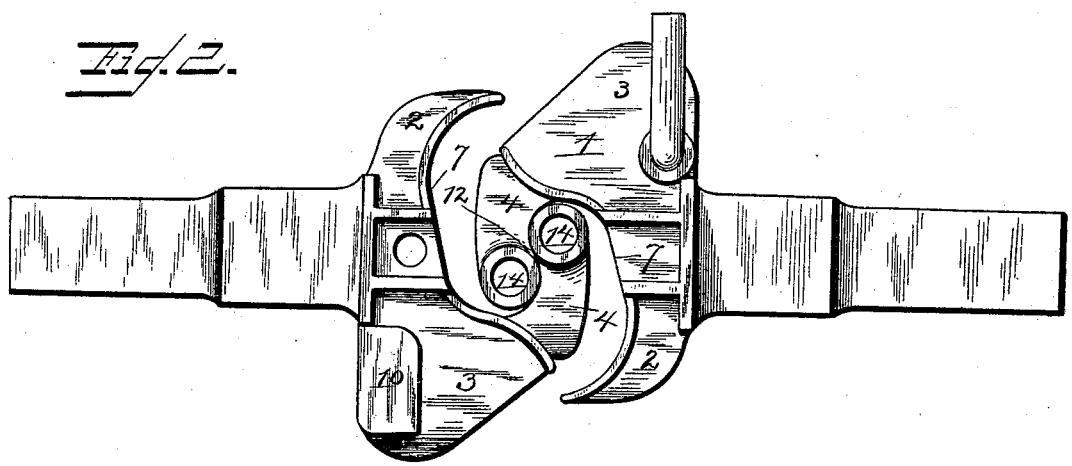
Figure 3:
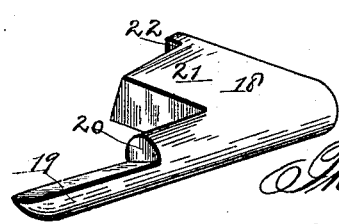
Figure 7:
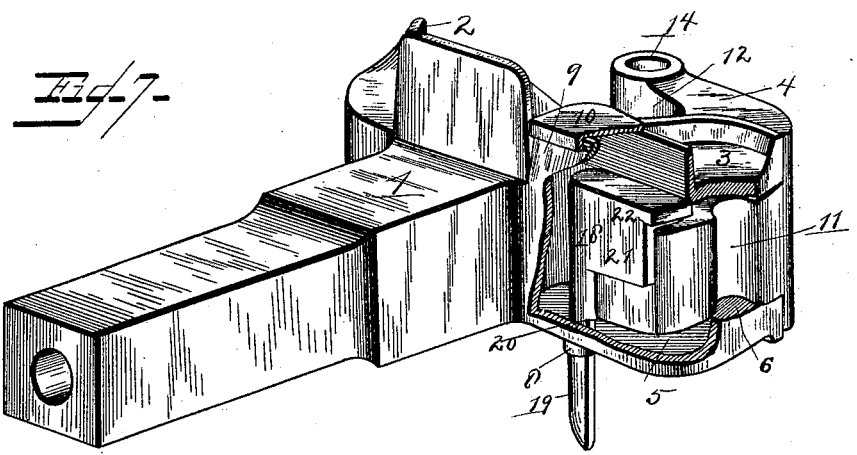
Figure 6:
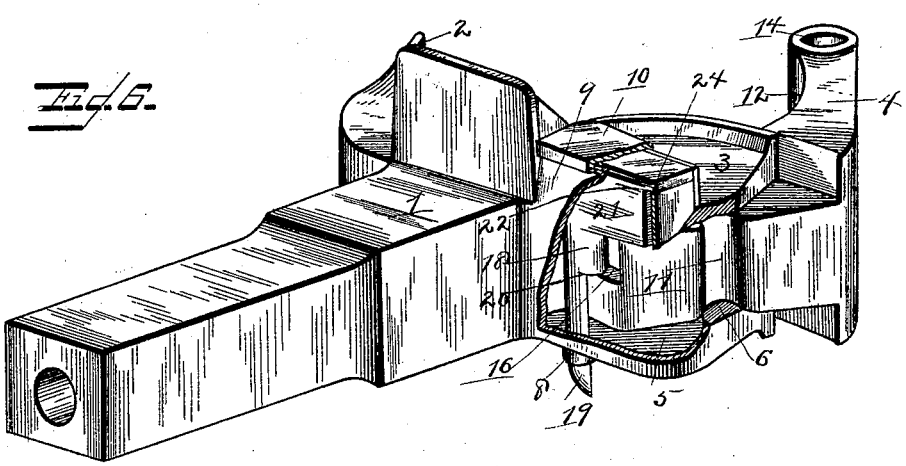

Figure 1 is a perspective view of one draw-head of my improved car-coupling. Fig. 2 is a top view of two draw-heads engaging each other. Fig. 3 is a bottom view of the same. Fig. 4 is a horizontal sectional view of one of the draw-heads. Fig. 5 is a similar view showing the pivoted hook tilted out ready for coupling. Fig. 6 is a perspective view of the draw-head seen from the rear, and showing parts of the draw-head broken away, the pivoted hook being tilted out ready for coupling.
Fig. 7 is a similar view showing the hook tilted in and in operative position for holding the opposite hook, and Fig. 8 is a view of the sliding key or pin.

The same numerals of reference indicate corresponding parts in all the figures.

My invention has relation to that class of car-couplings in which a pivoted hook swinging in a horizontal plane partly closes a recess formed in the end of the draw-head capable of receiving a similar hook from the opposite draw-head, and in which this hook may be locked in place when tilted inward; and it consists in the improved construction and combination of parts of such a car-coupling, in which the sliding key engaging the shoulder upon the hook and locking it by dropping down into its hole is cut away at its lower end for the passage of the curved inner end of the hook, and in which the hook is braced and guided by suitable shoulders, and the slide-key securely seated in the draw-head so as not to be lost, as hereinafter more fully described and claimed.

In the accompanying drawings, the numeral 1 indicates the draw-head, which may be attached and secured to the car in any suitable manner and provided with any suitable kind of springs for cushioning its play. The forward end of the draw-head is formed with a laterally-projecting and forwardly-curved horn or guide-arm, 2, at one side, and with a laterally-extending case or chamber, 3, at the opposite side, within which chamber the pivoted hook 4 is secured. The chamber is formed with an arc-shaped recess, 5, having a rounded post, 6, at the center of the arc, and the forward face of the draw-head is formed with a curved face portion, 7, above and below the forward opening of the arc-shaped recess, concentric with the recess and with the post. At the rear side of the arc-shaped recess a vertical perforation, 8, passes through the draw-head, intersecting the periphery of the recess with one-half of its diameter, and the upper wall of the chamber in the draw-head is preferably formed with a nearly-rectangular box, 9, at the upper end of this perforation, extending toward the outer side of the draw-head and closed by a sliding cover, 10, although this chamber may be dispensed with by another form of sliding key.

The hook 4 is S-shaped, and has its rear or inner end shaped in an arc to fit and turn perfectly within the arc-shaped recess, having a central cylindrical notch, 11, with which it may turn upon the central post of the recess. The forward portion of the hook is formed with rearwardly-facing shoulders 12 concentric with the arc of the rear end, and fitting and sliding against the arc-shaped faces of the draw-head, and at its outermost end the hook is preferably formed with a recess or notch, 13, for the reception of a common link, and with a vertical perforation, 14, for the pin when the coupling is used with a common pin-and-link coupling. The rear portion of the periphery of the inner end of the hook is formed with an arc-shaped rabbet, 15, forming a shoulder, 16, and a semi-cylindrical notch, 17, is formed in the periphery at the forward end of the rabbet, registering with the perforation in the chamber of the draw-head.

The sliding key or pin 18 is formed with a halved-in lower end, 19, which will form a shoulder, 20, which may rest upon the shoulder of the rabbet in the hook, the key or pin sliding vertically in the vertical perforation of the draw-head, and it will be seen that when the key is raised so as to bring the shoulder in a line with the rabbet of the hook the latter may be tilted outward, the rabbet sliding under the shoulder of the key, and when in coupling the hook is tilted inward the notch in the arc-shaped end of the hook and the vertical perforation will be brought to register, allowing the key to drop down in the cylindrical perforation thus formed, and causing the key to lock the hook in its position.

When the draw-head is shaped with the box at the upper portion of the vertical perforation, the key is formed with a head, 21, having a small lip, 22, for raising it easily, the said head fitting in the box, and being raised above the shoulder of the key a distance corresponding to the thickness of the shoulder upon the rabbeted periphery of the rear end of the hook, so that the cylindrical portion of the key will fit in the perforation formed and the head will rest upon the shoulder. The box and head will in this case serve to hold the key from turning, so that the halved-in side will at all times be presented to the arc-shaped periphery of the hook, and the lower end of the vertical perforation is preferably also shaped semi-cylindrical, so as to guide the key and keep it from turning, as shown at 23, and this shape of the lower end of the perforation becomes necessary when the key is not provided with the head sliding within the box, but is shaped as shown in one of the draw-heads of Fig. 2, where the key is shown provided with a simple bent upper end and with a split key in its lower end for preventing it from jumping out of its perforation.

The lip upon the headed key may, when the key is raised, engage a notch, 24, in the outer side of the box, owing to the fact that the pin must have sufficient play within the box to permit of its free vertical movement, and this play is just sufficient to permit of the lip engaging slightly with the shoulder, and may thus support the key while the hook is turned; but the lip will only support the key sufficiently to hold it while the hook is tilted, and will be disengaged from its notch whenever the draw-head is subjected to the slightest shock, so that the lip will not prevent the free working of the key while assisting in setting the hook for coupling.

When the heads are to be coupled, one or both hooks are tilted out by raising the sliding keys, suitable mechanism for raising the keys being capable of being connected to them, and when the draw-heads are brought together the hooks will be tilted in, allowing the keys to drop down and to lock the hooks in their holding position.

Having thus described my invention, I claim and desire to secure by Letters Patent of the United States—

1. A key for car-coupling of the character herein specified, consisting of the head 21, formed with the lip 22, the intermediate body portion formed with the shoulder 20, and the lower end halved-in or semi-cylindrical in form, substantially as and for the purpose set forth.

2. The combination of the draw-head having the arc-shaped recess and the vertical perforation intersecting the periphery of the said recess, and formed with the semi-cylindrical lower end, and with the laterally-extending box at the upper end, having the sliding cover and the notch in the outer side, the S-shaped hook having the arc-shaped rabbet in its inner arc-shaped end, and having the semi-cylindrical notch in the forward end of the rabbet in the periphery of the rear end, and the key having the lower semi-cylindrical or halved-in end sliding in the semi-cylindrical perforation, and having the shoulder fitting upon the rabbet, and provided with the head fitting in the box, and having the lip engaging the notch in the outer side of the box, as shown and described.

In testimony that I claim the foregoing as my own I have hereunto affixed my signature in presence of two witnesses.

THOMAS L. McKEEN.

Witnesses:
W. HACKETT, Jr.,
JOHN S. NOBLE.